(12) United States Patent
Felton

(10) Patent No.: US 9,330,029 B1
(45) Date of Patent: May 3, 2016

(54) MULTIPLE CONNECTOR IO BOARD FOR RECEIVING MULTIPLE I/O STREAM

(71) Applicant: EMC Corporation, Hopkinton, MA (US)

(72) Inventor: Mickey S. Felton, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 155 days.

(21) Appl. No.: 13/931,164

(22) Filed: Jun. 28, 2013

(51) Int. Cl.
*H05K 1/11* (2006.01)
*H05K 1/14* (2006.01)
*G06F 13/00* (2006.01)

(52) U.S. Cl.
CPC ..................... *G06F 13/00* (2013.01)

(58) Field of Classification Search
CPC ......... G06F 13/00; G06F 1/185; G06F 1/183; H05K 3/36; H05K 1/144
USPC .................................. 361/785, 788, 790, 796
See application file for complete search history.

(56) References Cited

U.S. PATENT DOCUMENTS

| 7,698,491 | B1 * | 4/2010 | King et al. | 710/306 |
| 8,107,256 | B1 * | 1/2012 | Kondrat et al. | 361/796 |
| 2010/0241799 | A1 * | 9/2010 | Schuette | 711/104 |

* cited by examiner

*Primary Examiner* — Bernard Rojas
(74) *Attorney, Agent, or Firm* — Krishnendu Gupta; Konrad R. Lee

(57) ABSTRACT

An apparatus and system for processing I/O from a data storage chassis, the apparatus and system comprising a first I/O printed circuit board (PCB) including I/O wafers; wherein the I/O wafers of the first I/O PCB are enabled to receive I/O from the data storage chassis; a second I/O PCB including I/O wafers; wherein the I/O wafers of the second I/O PCB are enabled to receive I/O from the data storage chassis; wherein the I/O wafers of the first I/O PCB is constructed and configured to receive the I/O wafers of the second I/O PCB.

5 Claims, 10 Drawing Sheets

MULTIPLE CONNECTOR IO BOARD FOR RECEIVING MULTIPLE I/O STREAM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

An apparatus and system for processing I/O from a data storage chassis, the apparatus and system comprising a first I/O printed circuit board (PCB) including I/O wafers; wherein the I/O wafers of the first I/O PCB are enabled to receive I/O from the data storage chassis; a second I/O PCB including I/O wafers; wherein the I/O wafers of the second I/O PCB are enabled to receive I/O from the data storage chassis; wherein the I/O wafers of the first I/O PCB is constructed and configured to receive the I/O wafers of the second I/O PCB.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, data storage chassis used in data storage systems contain a finite number of Small Logic Interface Cards (SLIC) slots for interfacing with the data storage chassis. Conventionally, data storage chassis have ten to twelve SLIC card slots. Generally, a few of the finite number of SLIC card slots may be used for managing the data storage chassis. Traditionally, the current mechanical structure and pinout of SLIC connectors and I/O connectors do not allow for utilizing the increased number of PCIEs and previously may have not been possible. Typically, expanding the number of SLIC cards used for I/O to the data storage chassis may not have been possible.

In many embodiments, the current disclosure may enable creation of SLIC form factor I/O cards that may be enabled to increase the amount of I/O to and from a data storage chassis. In various embodiments, the current disclosure may enable implementation of SLIC form factor I/O cards that double the I/O capability of current technology. In some embodiments, the current disclosure may enable full utilization of current data storage chassis design which may include an increased number of PCIe I/O communication lines available to users of the data storage chassis.

In many embodiments, the current disclosure may enable the creation of one or more I/O cards enabled to utilize the increased number of PCIEs in a data storage system. In various embodiments, the current disclosure may enable creation of a modified SLIC connector, pinout, and mechanical guidance system to enable doubling the density of each SLIC card to utilize the larger PCIE lane density connectors. In some embodiments, the current disclosure may enable doubling I/O density for each PCIexpress I/O card available. In many embodiments, SLIC form factor I/O cards may be enabled to translate PCIexpress to a plurality of different output types, such as, but not limited to, Fiber, FICON, Ethernet, SAS, SATA, Infiniband, and SRIO.

Figure 1:
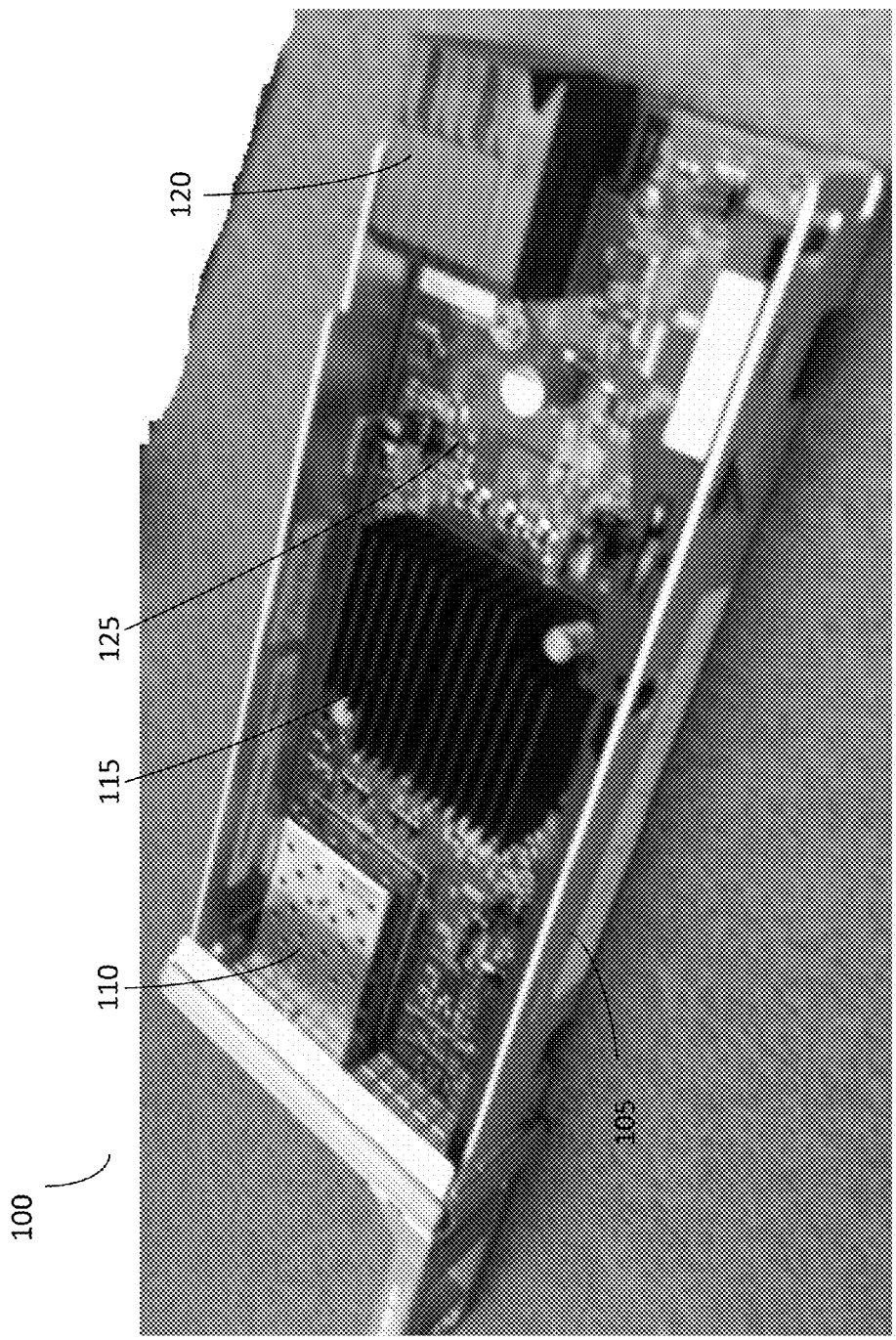
FIG. 1 is a simplified illustration of a multiple connector I/O card, in accordance with an embodiment of the present disclosure.

Refer to the example embodiment of FIG. 1. FIG. 1 shows a simplified illustration of a multiple connector I/O card, in accordance with an embodiment of the current disclosure. As shown, multiple connector I/O card 100 includes printed circuit board (PCB) 125, I/O processor 115, I/O wafers 120, and output ports 110. Multiple connector I/O card 100 is contained within SLIC Form factor chassis 105. In this embodiment, multiple connector I/O card 100 is enabled to receive two streams of PCIexpress I/O from a data storage chassis through I/O wafers 120. As shown, I/O processor 115 is enabled to convert PCIexpress I/O to alternative formats of I/O, such as: Fibre channel or Ethernet.

Figure 2:
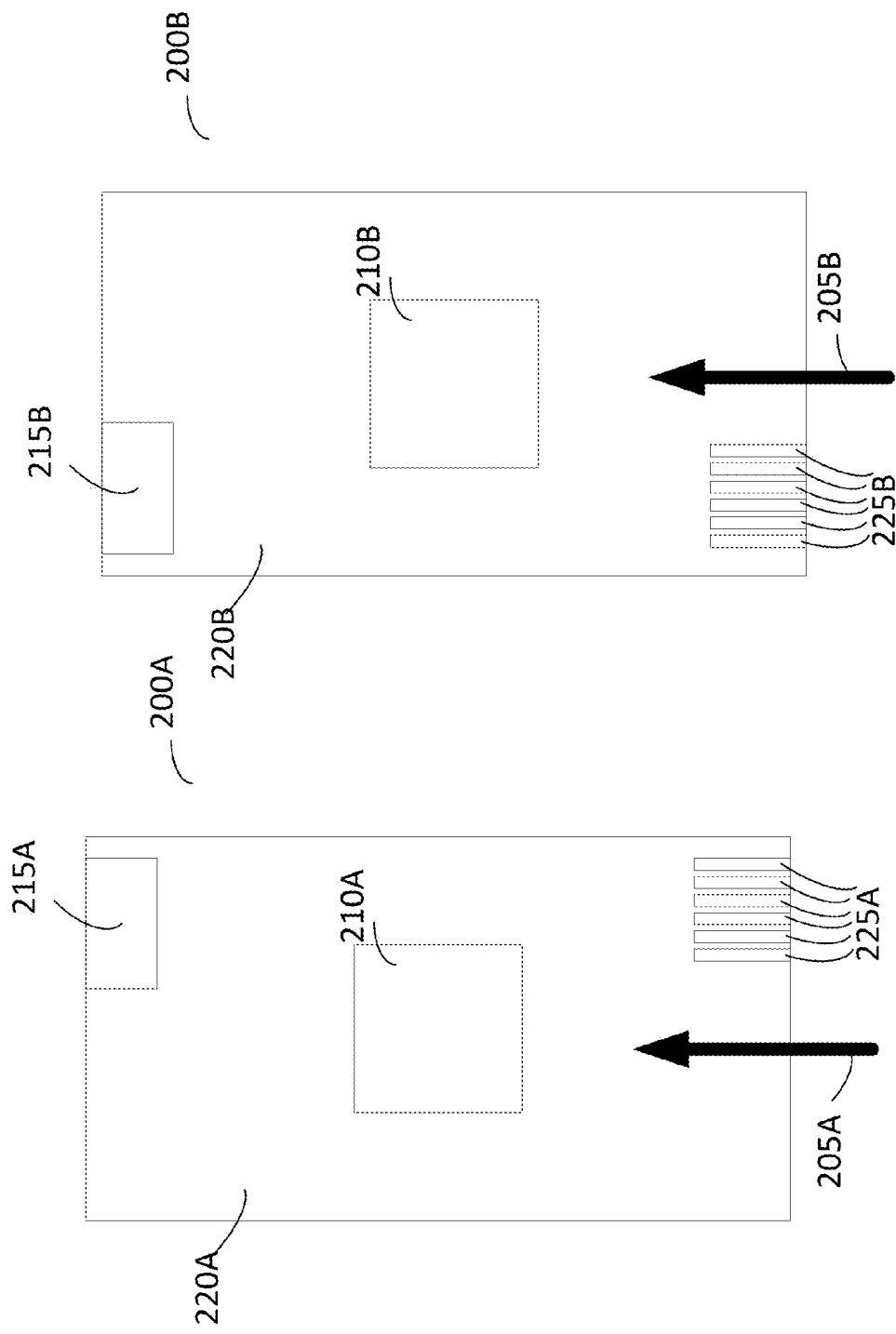
FIG. 2 is a simplified illustration two printed circuit boards (PCBs) comprising a multiple connector I/O card, in accordance with an embodiment of the present disclosure.

Refer to the example embodiment of FIG. 2. FIG. 2 shows a simplified illustration of two printed circuit boards (PCBs) which comprise a multiple connector I/O card, in accordance with an embodiment of the current disclosure. As shown, multiple connector I/O card (200A and 200B, 200 generally) is comprised of two mirrored cards. Multiple connector I/O card 200A includes printed circuit board 220A, I/O processor 210A, I/O wafers 225A, and output ports 215A. Similarly, Multiple connector I/O card 200B includes printed circuit board 220A, I/O processor 210A, I/O wafers 225A, and output ports 215A. In this embodiment, each multiple connector I/O card 200 is constructed and configured to be mounted within a SLIC form factor chassis. As shown, both multiple connector I/O cards 200 are enabled to be mounted within a single SLIC form factor chassis, which will be shown and explained later in the instant disclosure. Each multiple connector I/O card 200A, 200B is constructed and configured to create an airflow path across multiple connector I/O card 200A, 200B to facilitate cooling of PCBs 220A, 220B and I/O processors 210A, 210B. In this embodiment, the airflow path is denoted by arrow 205A and 205B. In FIG. 2, I/O wafers (225A, 225B, 225 generally) are configured and placed to enable mounting of both multiple connector I/O cards 200A, 200B within a SLIC Form factor chassis while preserving the airflow path across both multiple connector I/O cards 200A, 200B.

Figure 3:
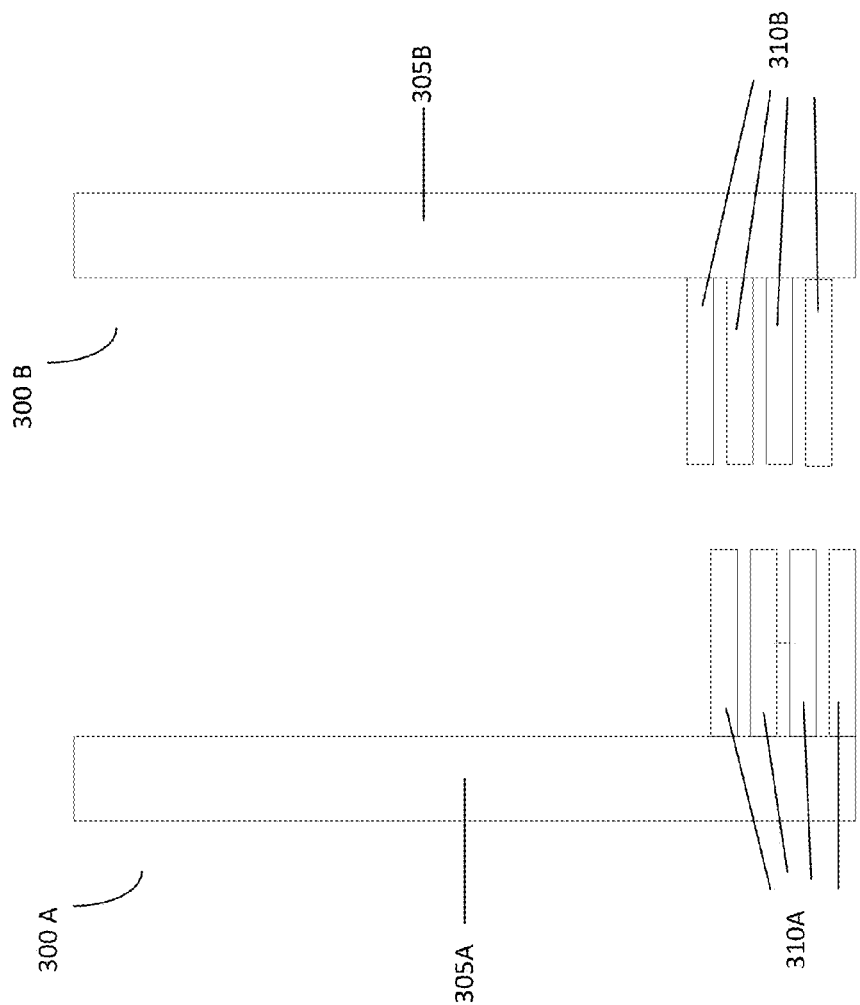
FIG. 3 is an alternate simplified illustration of a multiple connector I/O card, in accordance with an embodiment of the present disclosure.

Refer to the example embodiment of FIG. 3. FIG. 3 shows a simplified illustration of an alternative view of two multiple connector I/O cards, in accordance with an embodiment of the current disclosure. In FIG. 3, multiple connector I/O cards 300A, 300B are enabled to be combined in a single SLIC Form Factor chassis. In this embodiment, each multiple connector I/O card 300A, 300B includes a PCB 305A, 305B and I/O wafers 310A, 310B. In this embodiment, each output port is obscured by I/O wafers 310A and I/O wafers 310B. As shown, I/O wafers 310A are offset from I/O wafers 310B to enable interweaving of I/O wafers 310A, 310B. In this embodiment, interweaving I/O wafers 310A, 310B enables minimizing any obstruction of airway path between multiple connector I/O card 300A and multiple connector I/O card 300B. In many embodiments, the pattern of interweaving I/O wafers between multiple connector I/O cards may vary. In some embodiments, the interweaving pattern of I/O wafers may alternate between multiple connector I/O cards. In other embodiments, the interweaving pattern of I/O wafers may alternate in multiples of I/O wafers between multiple connector I/O cards. In many embodiments, interweaving of I/O wafers may provide stability for each multiple connector I/O card while mounted with SLIC form factor chassis.

Figure 4:
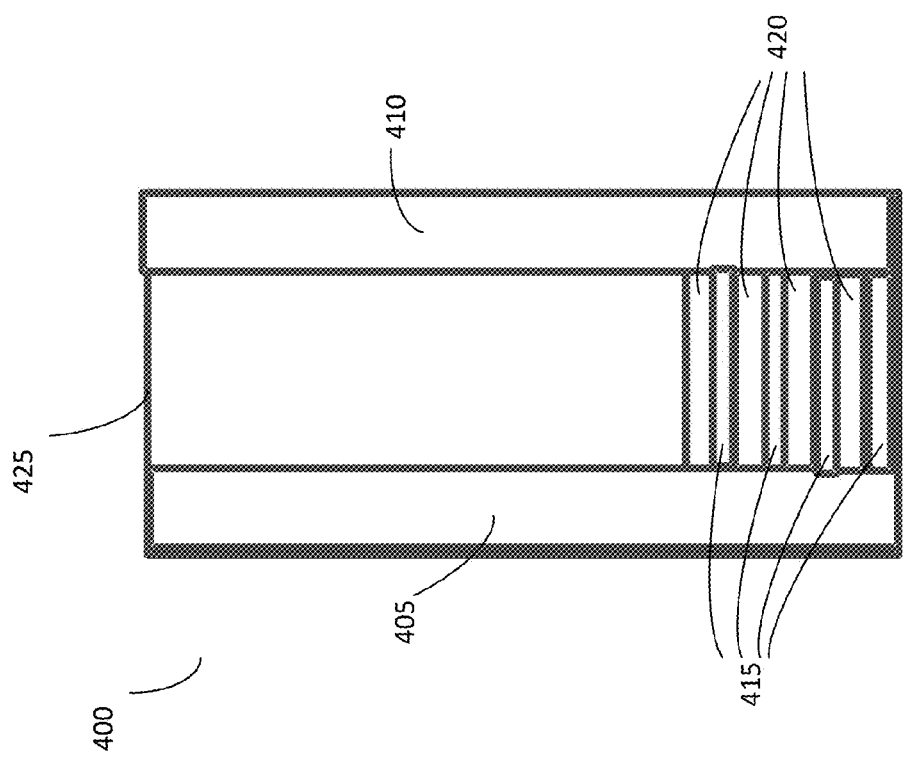
FIG. 4 is a simplified illustration of a multiple connector I/O card mounted within a SLIC, in accordance with an embodiment of the present disclosure.

Refer to the example embodiment of FIG. 4. FIG. 4 shows a simplified illustration of two multiple connector I/O cards mounted within a SLIC Form Factor chassis, in accordance with an embodiment of the current disclosure. In FIG. 4, two multiple connector I/O cards are shown mounted with SLIC Form Factor chassis 425. As shown, PCB 405 and PCB 410 are mounted within SLIC Form Factor Chassis 425. Although not shown in this view, each PCB 405, 410 include an I/O processor and an output port. In this embodiment, I/O wafers 415 and I/O wafers 420 are shown interwoven and/or interleaved when mounted within SLIC Form Factor Chassis 425.

Figure 5:
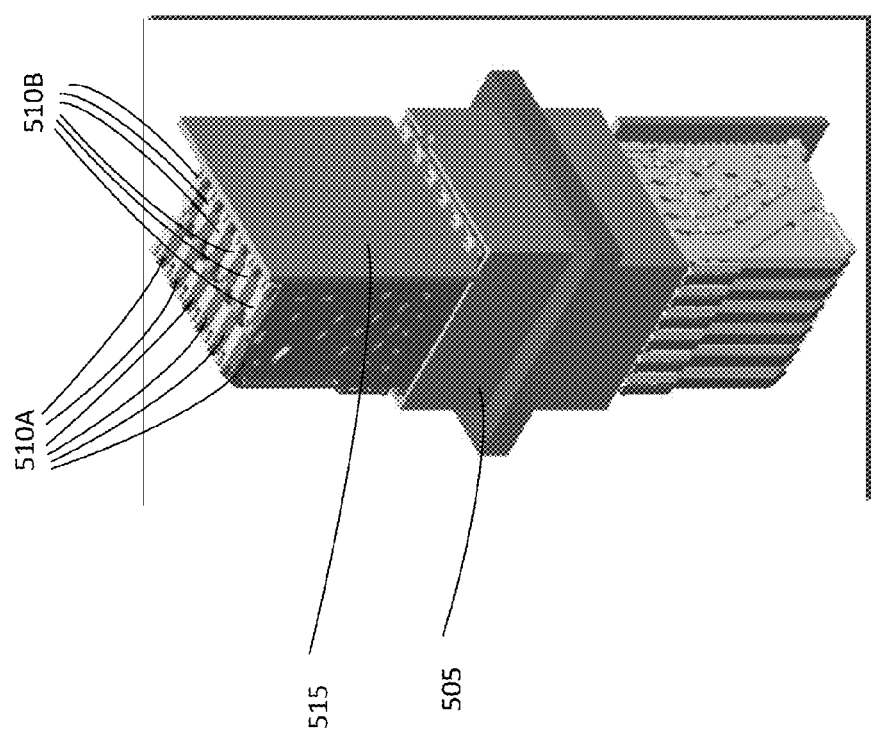
FIG. 5 is a simplified illustration a connector of a multiple connector I/O card, in accordance with an embodiment of the present disclosure.

Refer to the example embodiment of FIG. 5. FIG. 5 shows a simplified illustration of I/O wafers connected to a mated connector, in accordance with an embodiment of the current disclosure. In this embodiment, connector portion 515 of a multiple connector I/O card is mated to a data storage chassis connector 505. Referring to FIGS. 4 and 5, I/O wafers 415 (FIG. 4) correspond to I/O wafers 510A (FIG. 5) and I/O wafers 420 (FIG. 4) correspond to I/O wafers 510B (FIG. 5). As shown, I/O wafers 510A, 510B are interwoven and/or interleafed such that each I/O wafer is stacked in an alternating fashion.

Figure 6:
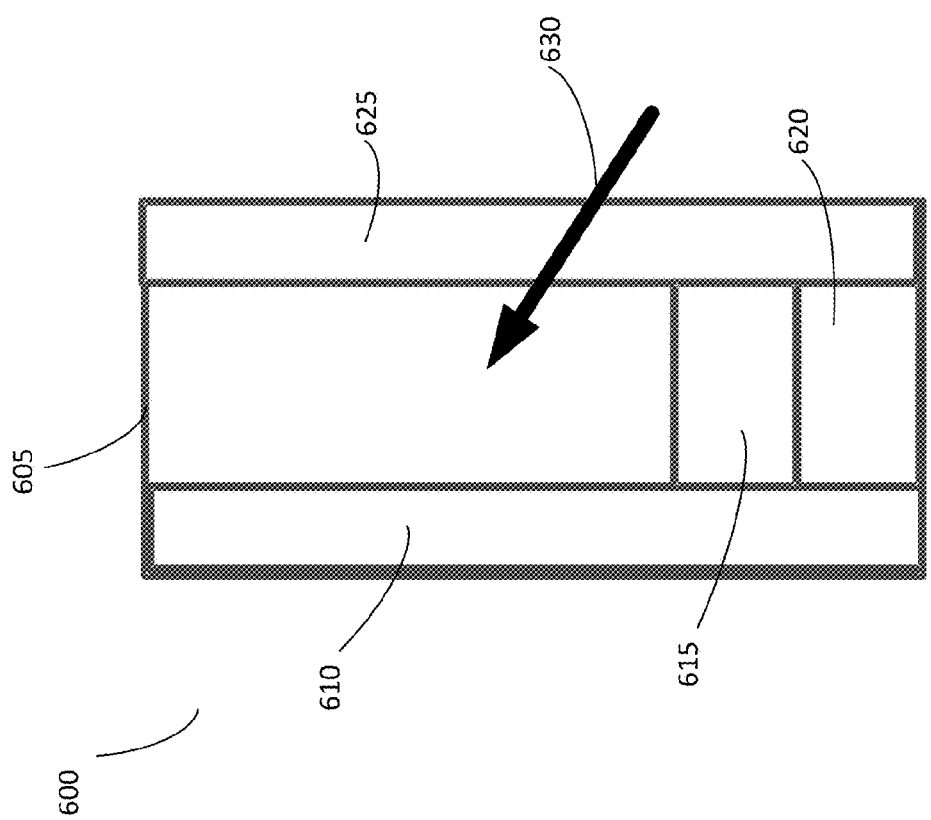
FIG. 6 is an alternate simplified illustration of two multiple connector I/O cards, in accordance with an embodiment of the present disclosure.

Refer to the example embodiment of FIG. 6. FIG. 6 shows an alternate simplified illustration of two multiple connector I/O cards, in accordance with an embodiment of the current disclosure. As shown, multiple connector I/O cards 600 are mounted within SLIC form factor chassis 605. Multiple connector I/O card 600 includes PCBs 610, 625 and I/O wafers 615, 620. In this embodiment, I/O wafers 615, 620 are not interwoven, however are stacked together to reduce any obstruction to airway path pointed to by arrow 630.

Figure 7:
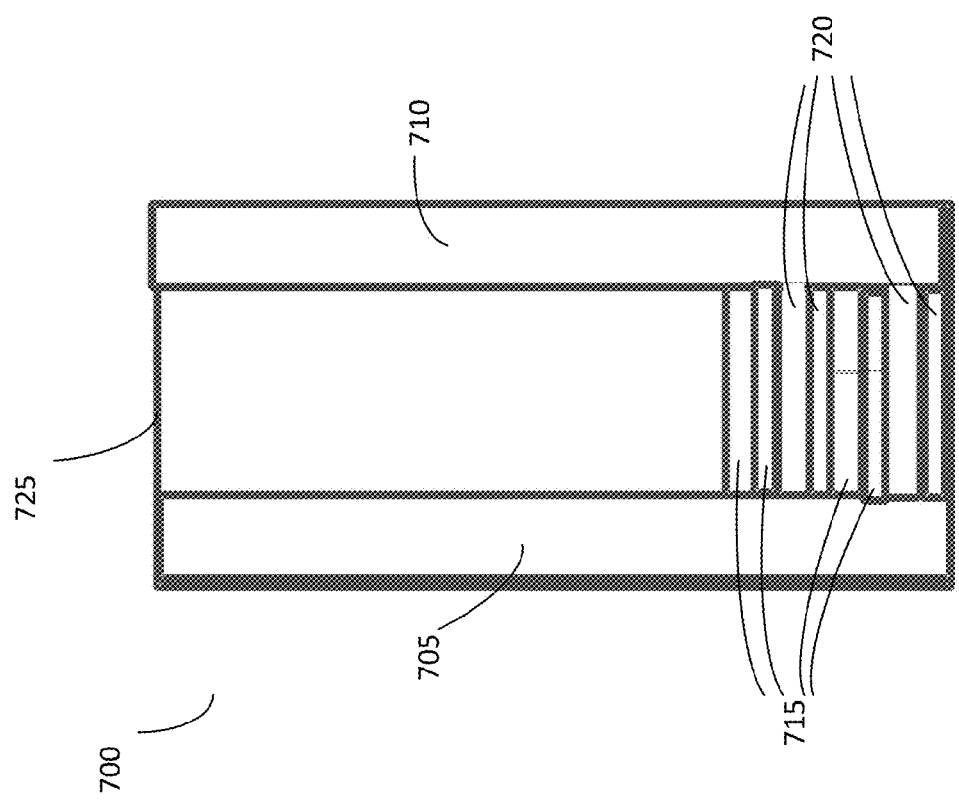
FIG. 7 is a further alternate simplified illustration of two multiple connector I/O cards, in accordance with an embodiment of the present disclosure.

Refer to the example embodiment of FIG. 7. FIG. 7 shows a further alternative simplified illustration of two multiple connector I/O cards, in accordance with an embodiment of the current disclosure. As shown, multiple connector I/O cards 700 are mounted within SLIC form factor chassis 725. Multiple connector I/O cards 700 includes PCBs 705, 710 and I/O wafers 715, 720. In this embodiment, I/O wafers 715, 720 are interwoven and/or interleaved in multiples of two.

Figure 8:
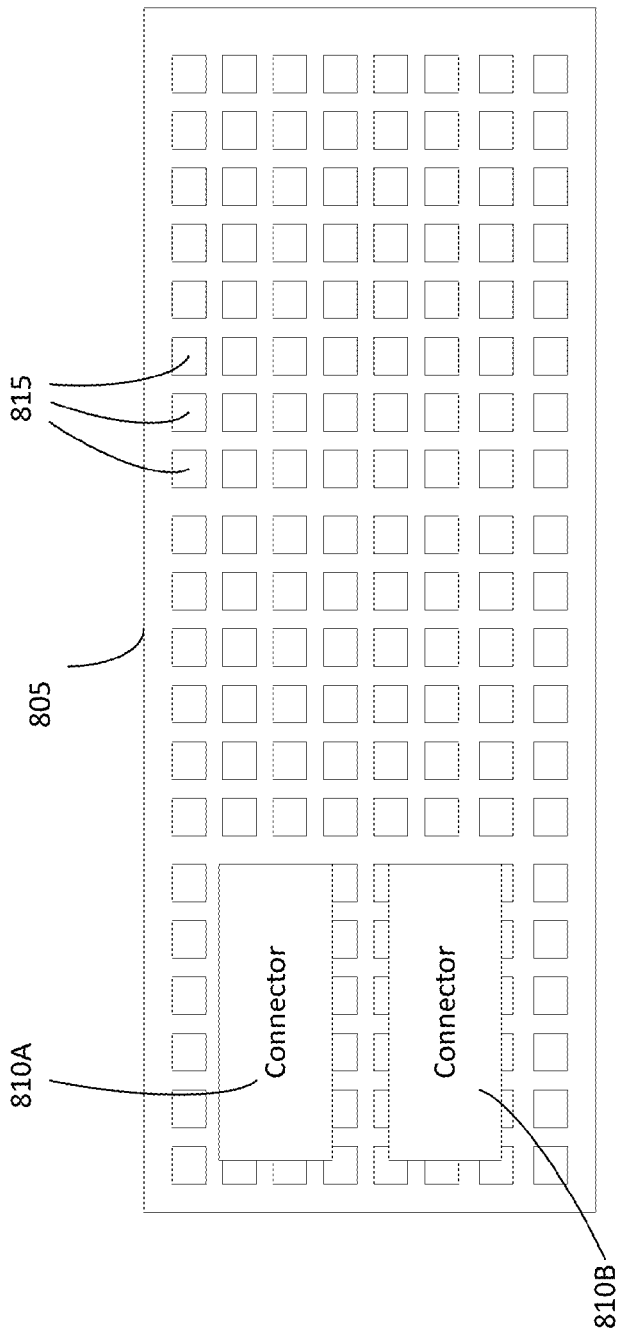
FIG. 8 is a simplified illustration of an alternate perspective of FIG. 7, in accordance with an embodiment of the present disclosure.

Refer to the example embodiment of FIG. 8. FIG. 8 shows an alternate view of FIG. 8, in accordance with an embodiment of the current disclosure. FIG. 8 shows the opposite perspective of SLIC Form factor chassis 805 (725, FIG. 7). In this embodiment, SLIC Form factor chassis 805 includes airway ports 815 enabled to allow an airway path to pass through SLIC Form factor chassis 805. As shown, connectors 810A, 810B from each multiple connector I/O card contained within SLIC Form Factor Chassis 805 are accessible through SLIC Form Factor Chassis 805.

Figure 9:
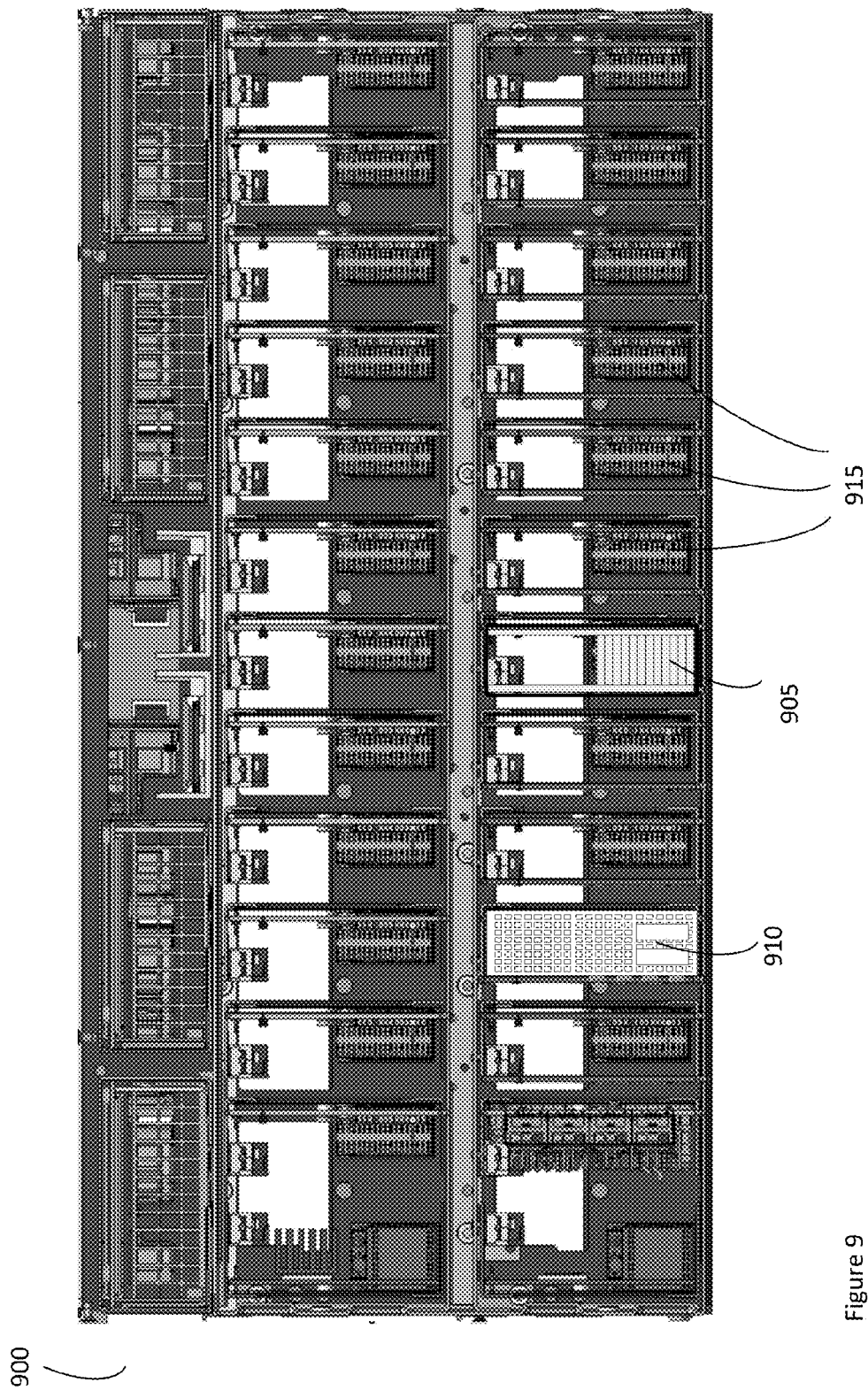
FIG. 9 is a simplified illustration of an I/O connector portion of a data storage chassis, in accordance with an embodiment of the present disclosure.

Refer to the example embodiment of FIG. 9. FIG. 9 shows a simplified illustration of an I/O connector portion of a data storage chassis, in accordance with an embodiment of the present disclosure. As shown, I/O connector portion 900 includes a plurality of slots enabled to receive SLIC form factor chassis. In this embodiment, I/O connector portion 900 includes I/O connectors 915 enabled to receive multiple connector I/O cards. In FIG. 9, SLIC Form factor chassis 910 is shown installed in I/O connector portion 900. Multiple connector I/O cards within SLIC Form Factor chassis 910 are enabled to communicate through I/O connector portion 900 of the data storage chassis. In this embodiment, cutaway view of SLIC Form Factor Chassis 905 is shown providing a view of the I/O wafers which are enabled to communicate with the I/O connector portion 900. As shown, I/O connector portion 900 is enabled to communicate I/O from the associated data storage chassis in PCIe format.

Figure 10:
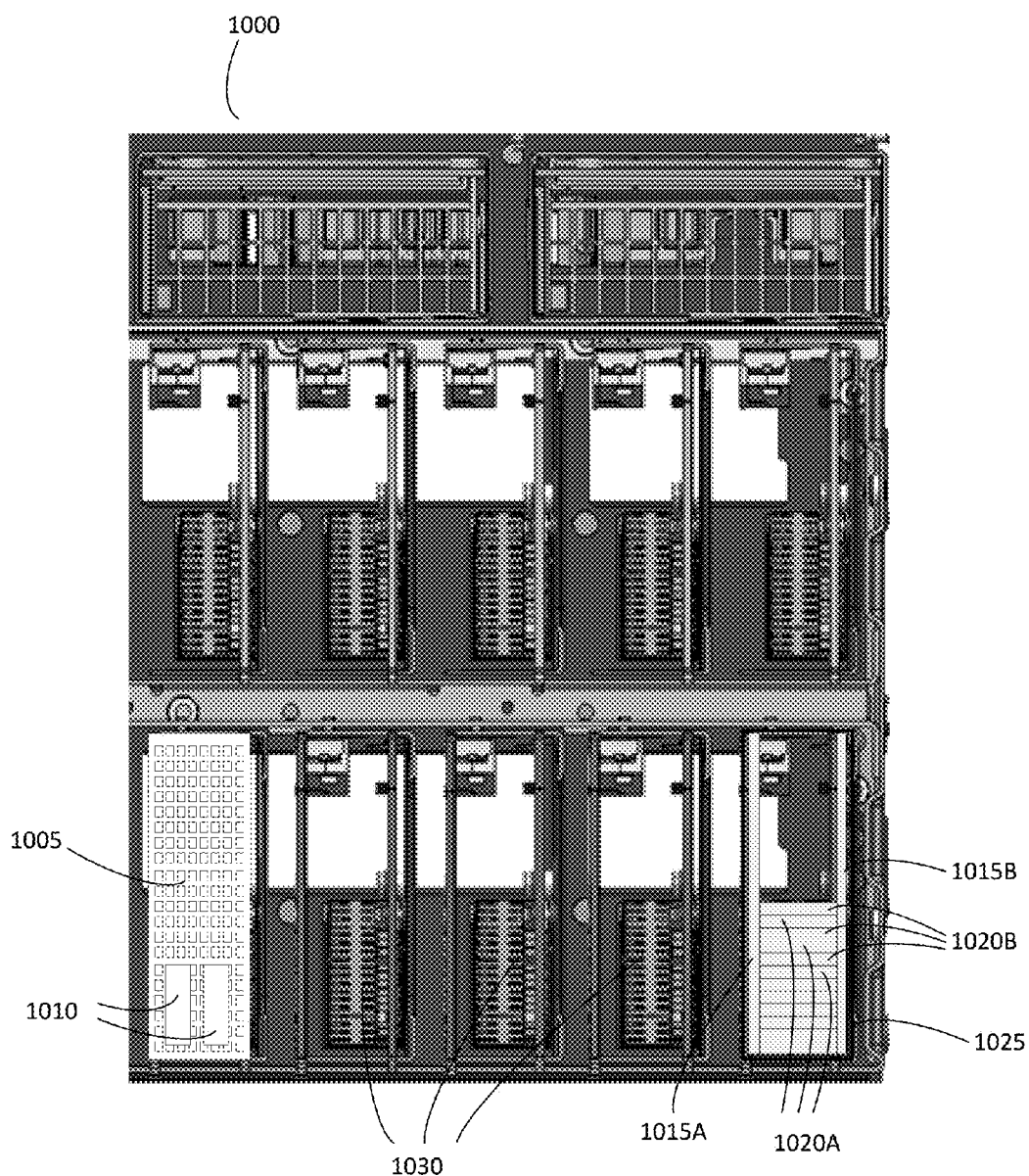
FIG. 10 is an alternate simplified illustration of an I/O connector portion of a data storage chassis, in accordance with an embodiment of the present disclosure.

Refer to the example embodiment of FIG. 10. FIG. 10 shows an alternate simplified illustration of an I/O connector portion of a data storage chassis, in accordance with an embodiment of the present disclosure. As shown, I/O connector portion 1000 includes a plurality of SLIC Form Factor chassis slots. Each SLIC Form Factor chassis slot includes I/O connector 1030. In this embodiment, SLIC Form Factor chassis 1005 is communicatively coupled to I/O connector portion 1000 of a data storage chassis. SLIC Form Factor chassis 1005 includes output ports 1010 enabled to output I/O through I/O connector portion 1000 from associated data storage chassis. In FIG. 10, a cutaway view of a SLIC Form Factor chassis 1025 is shown comprised of multiple connector I/O cards 1015 A, 1015B. Multiple connector I/O card 1015A includes I/O wafers 1020A. Multiple connector I/O card 1015B includes I/O wafers 1020B. In this embodiment, I/O wafers 1020A, 1020B enable multiple connector I/O cards 1015A, 1015B to communicate through I/O connector portion 1000 of associated data storage chassis.

It should again be emphasized that the implementations described above are provided by way of illustration, and should not be construed as limiting the present invention to any specific embodiment or group of embodiments. For example, the invention can be implemented in other types of systems, using different arrangements of devices. In some embodiments, the invention may be used for server boards, server blades, I/O cards, CPU cards, switches, and/or any type of blade connector application. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art. These and further modifications and substitutions made by one of ordinary skill in the art are within the scope of the present invention which is not to be limited, except by the claims which follow.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system, comprising:
   a data storage chassis, including an I/O portion enabled to output I/O in PCIe format;
   an apparatus for processing I/O from the data storage chassis, the apparatus comprising:
      a first I/O printed circuit board (PCB) including I/O wafers; wherein the I/O wafers of the first I/O PCB are enabled to receive I/O from the data storage chassis;
      a second I/O PCB including I/O wafers; wherein the I/O wafers of the second I/O PCB are enabled to receive I/O from the data storage chassis;
      wherein the I/O wafers of the first I/O PCB is constructed and configured to receive the I/O wafers of the second I/O PCB
      wherein the I/O wafers of the first I/O PCB and the I/O wafers of the second I/O PCB are in physical contact.

2. The apparatus of claim 1, wherein the I/O wafers of the first I/O PCB are interleaved with the I/O wafers of the second I/O PCB.

3. The apparatus of claim 1, wherein the first I/O PCB is enabled to convert received I/O from the data storage chassis to Fiber Channel.

4. The apparatus of claim 1, wherein the first I/O PCB is enabled to convert received I/O from the data storage chassis to FICON.

5. The apparatus of claim 1, wherein the first I/O PCB is enabled to convert received I/O from the data storage chassis to Ethernet.

* * * * *